Figure 1:
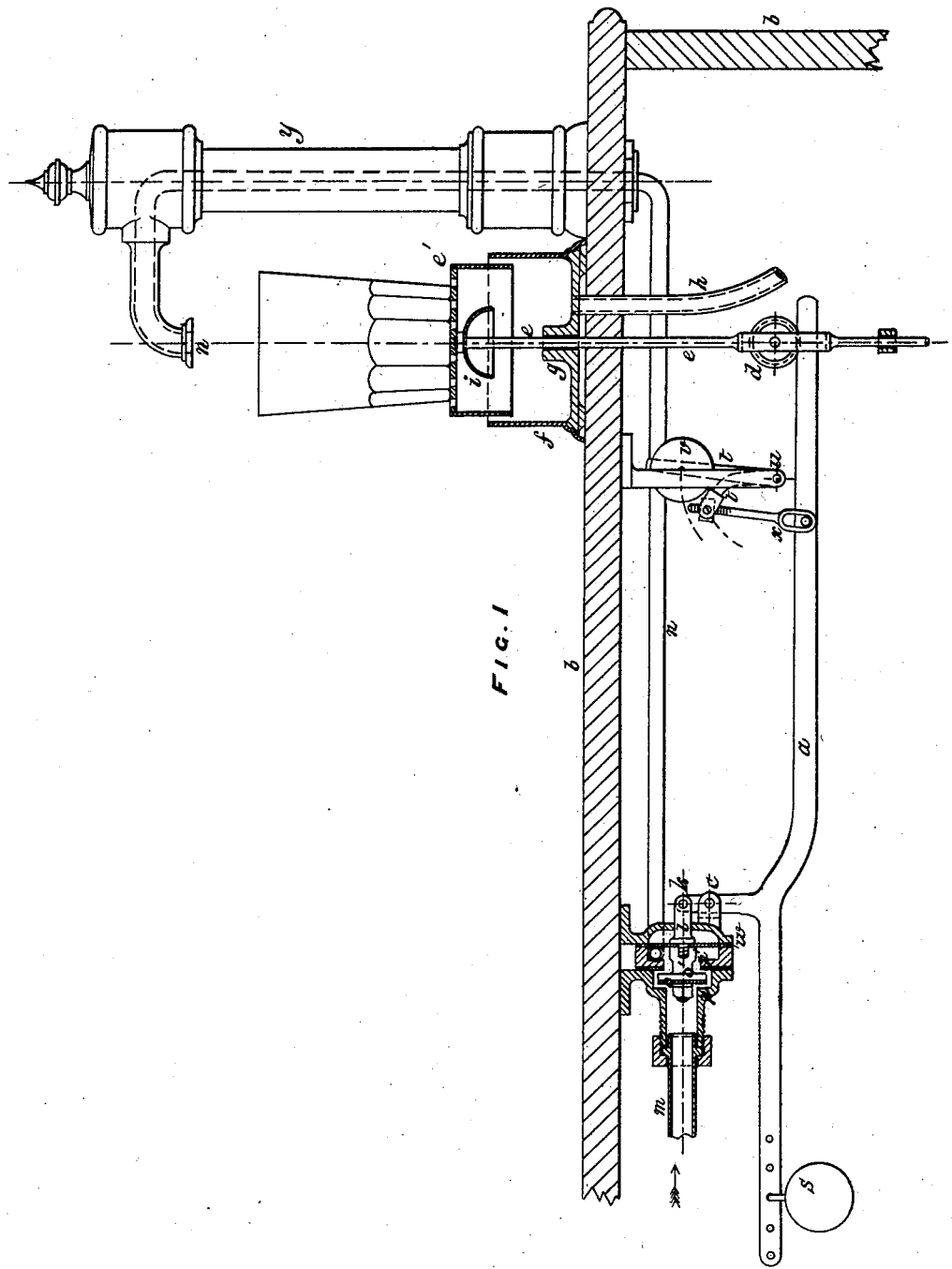

M. G. WHITE.
SELF-REGULATING APPARATUS FOR SUPPLYING WATER.

No. 174,396. Patented March 7, 1876.

Witnesses.
Frank H. Jordan
Charles E. Clifford

Inventor.
Matthias George White
per William Henry Clifford
atty.

UNITED STATES PATENT OFFICE.

MATTHIAS GEORGE WHITE, OF LANDPORT, ASSIGNOR TO WILLIAM TRIGGS, OF PORTSMOUTH, ENGLAND.

IMPROVEMENT IN SELF-REGULATING APPARATUS FOR SUPPLYING WATER.

Specification forming part of Letters Patent No. 174,396, dated March 7, 1876; application filed December 27, 1875.

*To all whom it may concern:*

Be it known that I, MATTHIAS GEORGE WHITE, of Landport, in the county of Hants, England, have invented a Self-Regulating Apparatus for Supplying Water; and I do hereby declare that the following is a full, clear, and exact description thereof, reference being had to the accompanying drawing, making part of this specification, in which—

Figure 1 is a side view, partly in section, of apparatus embodying my invention.

This invention has for its object a novel arrangement of apparatus, by which the flow of water or other liquid supplied through a pipe into a glass or other vessel may be regulated or stopped, as required, by means of mechanism actuated by the weight of such glass or other vessel, and it is particularly applicable to the purpose of supplying water for drinking, but it may also be used for other purposes.

In the accompanying drawing, $a$ is a lever, preferably arranged out of sight, under the table or counter $b$. The lever $a$ turns upon the center $c$, near one of its ends, and at or near its other end it is connected, preferably, by a friction-roller, as shown at $d$, with a vertical rod or spindle, $e$, which passes up through the table $b$, and carries at its upper end a stand or platform, $e'$, upon which the vessel which is to be filled is placed. The platform $e'$ is made open or perforated, so that any water which may be spilled drains through it. $f$ is a ring or frame fixed to the table $b$, and having a central guide, $g$, through which the spindle $e$ passes, so as to rise and fall with as little friction as possible. $h$ is a waste-pipe, through which any water passing into the frame $f$ is carried away, and $i$ is an inverted cup or shield fixed round the spindle $e$, to prevent water from entering the guide $g$. At or near the center $c$, upon which the lever $a$ turns, the short arm $k$ is connected to it, and works the spindle $l$ of the regulating-valve. This valve has an inlet-pipe, $m$, and a discharge-pipe, $n$, through which the water is supplied, through an ornamental stand, $y$, to the vessel upon the platform $e$. $o$ is a flexible disk attached to a collar, $o'$, upon the spindle $l$; and $p$ is a seat against which the disk $o$ is pressed to close the inlet-pipe, and $p'$ is a seat against which the collar $o'$ upon the spindle is pressed (in the other direction) to close the outlet-pipe. $w$ is a flexible diaphragm attached to the spindle $l$, to prevent the escape of water round the latter. $s$ is an adjustable balance-weight, by which, when the vessel is removed, the platform $e'$ is raised. $t$ is a supplementary lever, turning upon a center, $u$, and having an adjustable weight, $v$, on one arm, the other arm being connected by a slot, $x$, with the lever $a$.

The operation of the apparatus is as follows: When the glass or other vessel is removed, the platform $e'$ is raised by the action of the weight $s$, and the inlet-pipe $m$ is, at the same time, closed by the disk $o$ being pressed against the seat $p$. When the vessel is placed upon the platform its weight is sufficient to depress the latter until the lever $a$ is stopped at the bottom of the slot $x$. In this position, as shown in the drawing, the valve is open, and the water can pass from the inlet-pipe $m$ into the outlet-pipe $n$, and through the ornamental stand $y$ into the vessel. When the vessel is sufficiently full the weight of the water in it is sufficient to throw the weight $v$ over its center, which further depresses the lever $a$, until the outlet-pipe $n$ is closed by the collar $o'$ being pressed against the seat $p'$. When the vessel of water is removed, the platform rises to its original position by the action of the weight $s$.

Sometimes I make the valve consist of two flexible disks, separated by a central washer attached to the spindle $l$, so that if the spindle be pressed in one direction one of the flexible disks closes the seat $p$, and if in the other direction the other disk closes the seat $p'$.

The disks may be held at their outer edges, holes for the passage of water being made through them.

The stand through which the pipe $m$ passes, which conveys to the water to the vessel, is made of any ornamental shape, and the water may be made to pass through a filter, or through ice, in its passage.

Having now described my invention, what I claim as new is—

1. The combination of the balanced lever $a$, carrying the glass or other vessel, with the regulating-valve, operated by it, and closing when moved in either direction, for the purpose of regulating the supply of liquid by the weight of the vessel, substantially as described, and shown in the drawing.

2. The combination, with the balance-lever $a$ and regulating-valve, operating as described, of a supplementary weighted lever, $t$, operated by the weight of the liquid in the vessel, substantially as described, and shown in the drawing.

3. The combination, with the weighted levers $a$ and $t$ and the regulating-valve, of the ornamental supply-pipe $y$, the movable platform $e'$, the frame $f$, and waste-pipe $h$, substantially as described, and shown in the drawing.

In testimony whereof I have signed my name to this specification in the presence of two subscribing witnesses.

MATTHIAS GEORGE WHITE.

Witnesses:
   GEORGE FELTHAM,
   JOSEPH MICHELL.